United States Patent [19]
Cobb

[11] 3,857,033
[45] Dec. 24, 1974

[54] DETECTING MALIGNANT CELLS

[75] Inventor: Carolus M. Cobb, Arlington, Mass.

[73] Assignee: American Science & Engineering, Inc., Cambridge, Mass.

[22] Filed: Apr. 26, 1972

[21] Appl. No.: 247,740

[52] U.S. Cl. .............................. 250/303, 250/302
[51] Int. Cl. ............................................ G21h 5/02
[58] Field of Search ....... 250/71 T, 83.3 UV, 106 T, 250/302, 303

[56] References Cited
UNITED STATES PATENTS

| | | | |
|---|---|---|---|
| 3,497,690 | 2/1970 | Wheeless, Jr. et al.. | 250/83.3 UV X |
| 3,586,859 | 6/1971 | Katz et al. | 250/83.3 UV |
| 3,673,410 | 6/1972 | Waite et al. | 250/106 T |
| 3,678,148 | 7/1972 | Caiola | 250/106 T |

Primary Examiner—Archie R. Borchelt
Attorney, Agent, or Firm—Charles Hieken, Esq.; Jerry Cohen, Esq.

[57] ABSTRACT

Techniques for detecting malignant cells, especially useful in Papanicolau smear analysis, comprise placing the scrapings of epithelial cells from the cervix or oral cavity, obtained either as fresh samples or samples previously fixed in alcohol, formalin, Bouin's solution, or other standard fixatives (provided that fixatives which may react with the gallium be removed from the cells by washing prior to use) in a solution containing gallium chloride, gallium citrate or another gallium salt and allowing the gallium to be absorbed by the cells. After an equilibration period of 20 minutes to 24 hours, so that gallium pickup by malignant cells is complete, excess gallium is removed by repeated washing of the cellular material. According to one aspect of the invention, the treated cells are used to prepare a smear on a slide which may be stained. The total number of cells present, or the mass of the smear is determined by a separate measurement, such as weighing. The gallium present may then be determined by radioactive counting techniques or by fluorescent techniques. These techniques may embrace one or both of integrated measurement or point-by-point scanning.

According to another aspect of the invention, the treated cells may be examined one by one for gallium content in a capillary flow apparatus using either the nuclear radiation of a gallium isotope to detect the gallium present in the individual cells or the treated cells may be subjected to a secondary treatment with a dye such as 8-hydroxyquinoline which has a high specific fluorescence when combined with gallium and the gallium content of individual cells determined by a fluorescent detection method.

27 Claims, 3 Drawing Figures

FIG. 3  $Ga^{67}$ UPTAKE (grains/4 Whipple squares)

3,857,033

DETECTING MALIGNANT CELLS

BACKGROUND OF THE INVENTION

The present invention relates in general to detecting malignant cells and more particularly concerns a novel technique for inducing malignant exfoliated cells to absorb gallium in-vitro subsequently detecting the probability of malignancy through measurement of the gallium content of the cells using either fluorescence or radioactivity detection methods. The invention seems to be especially useful in connection with Papanicolau (PAP hereinafter) smear analysis for eliminating clearly normal smears from extensive examination by a skilled cytotechnician or cytopathologist so that detailed examination need only be made for those smears having a high probability of malignant cells being present. The substantially cell-by-cell examination aspect of the invention may facilitate more accurate diagnosis with a less expensive test.

A PAP test involves smearing scrapings from the cervix upon a slide. The slide is stained with two or three dyes, then a cytotechnician observes the slide under a microscope, looking for cells meeting the criteria of malignancy. In general these are:

1. The ratio of nucleus to cytoplasm is altered.
2. When the nuclear chromatin is not condensed, it shows a "blotched" pattern; often with irregular cleared areas.
3. There is variation in nuclear size (anisonucleosis) and staining intensity of chromatin (anisochromia) among the abnormal cells.
4. The nuclear membrane is irregular and shows abrupt variation in thickness.
5. The nuclear chromatin shows sharp points and angles.
6. The nuclei show abnormal nuclei — more than the normal number or increase in size.

If the slide looks suspicious, the technician calls in a cytopathologist.

One slide examination typically takes a technician 15 minutes for a negative specimen. Typically, there are only 55 positives in 10,000 specimens. The present manual testing procedures involve much wasted time of skilled technicians.

For a discussion of attempts to automate PAP smear analysis, reference is made to SUMMARY OF STATE-OF-THE-ART WORKSHOP ON PAPANICOLAU SMEAR ANALYSIS edited by Ramsey-Klee in April 1970, available from the Clearinghouse for Federal Scientific and Technical Information in Springfield, Va. The use of fluorescent detectors has been suggested, and there is literature indicating that gallium 67 may be used for localizing tumors in vivo. There is no prior reported information on the use of Ga. 67 for distinguishing malignant cells from normal or atypical, but not malignant cells in-vitro.

Gallium 67 is a radio-isotope with a half-life of only 78 hours, thus even in-vitro test procedures using gallium 67 for mass testing, require the use of a central testing laboratory. For mass testing the gallium 67 would have to be rushed to the testing laboratory and used essentially within 6 days after its creation (two half-lives) to avoid undue losses from radioactive decay.

Accordingly, it is an important object of this invention to provide methods and means for detecting malignant cells which permit smear specimens to be sent to central testing laboratories for gallium analysis and which avoid the use of radioactive gallium in the clinics or physicians' offices where smear specimens are taken from patients.

It is another object of the invention to provide improved techniques for detecting malignant cells suitable for use in systems for automatically examining PAP smears and rejecting for manual examination negative specimens while indicating the small number that are or may be positive.

It is a further object of the invention to achieve one or more of the preceding objects with a technique that may be largely performed by relatively unskilled personnel.

It is a further object of the invention to provide more accurate tests for malignancy that may be performed more rapidly at less expense.

SUMMARY OF THE INVENTION

According to the invention, a specimen that may contain normal and malignant exfoliated cells is mixed with a solution of a gallium compound, such as gallium citrate or another gallium salt to cause the malignant cells to absorb gallium. Preferably, this mixing occurs sufficiently long so that gallium absorption is substantially complete, typically for 20 minutes to 24 hours. The solution composition is previously adjusted with respect to acidity (pH) and the presence of neutral salts to favor specific selective uptake of gallium by malignant, pre-malignant, or inflamed cells. Under these conditions the gallium level of the specimen is determined primarily by the gallium uptake of only a small fraction of the total specimen (~25%) and is a measure of the state of health of the specimen. The gallium level of the specimen may then be detected by fluorescent or radioactive detection techniques.

According to one aspect of the invention, radioactive gallium 67 is used as the source of gallium. The suspension of the cells which have absorbed the gallium 67 are manipulated to provide a smear specimen. The total mass or number of cells in the smear specimen is determined by weighing or other suitable techniques, and the total radioactivity of the smear is determined by radioactive counting techniques.

According to another aspect of the invention, the suspension of cells which have absorbed the gallium 67 are examined one by one for gallium content in a capillary flow apparatus using radioactive detection techniques.

According to another aspect of the invention a spot test is performed on the solution with a spot test reagent tagged with a radioactive chemical, such as sulfur-35, to provide gallium tagged with the radioactive chemical for exposure to a flow counter detector to produce a count representative of malignancy. Preferably, a smear is prepared and measured to determine the total number of cells by weighing or other suitable techniques before exposure to a radiation detector.

According to another aspect of the invention, the treated cells are subjected to a secondary treatment with a material such as 8-hydroxyquinoline, which may include staining and then examined one by one for gallium content in a capillary flow apparatus using fluorescent detection techniques.

Numerous other features, objects and advantages of the invention will become apparent from the following specification when read in connection with the accompanying drawing in which:

DETAILED DESCRIPTION OF PREFERRED EMBODIMENTS

Figure 1:
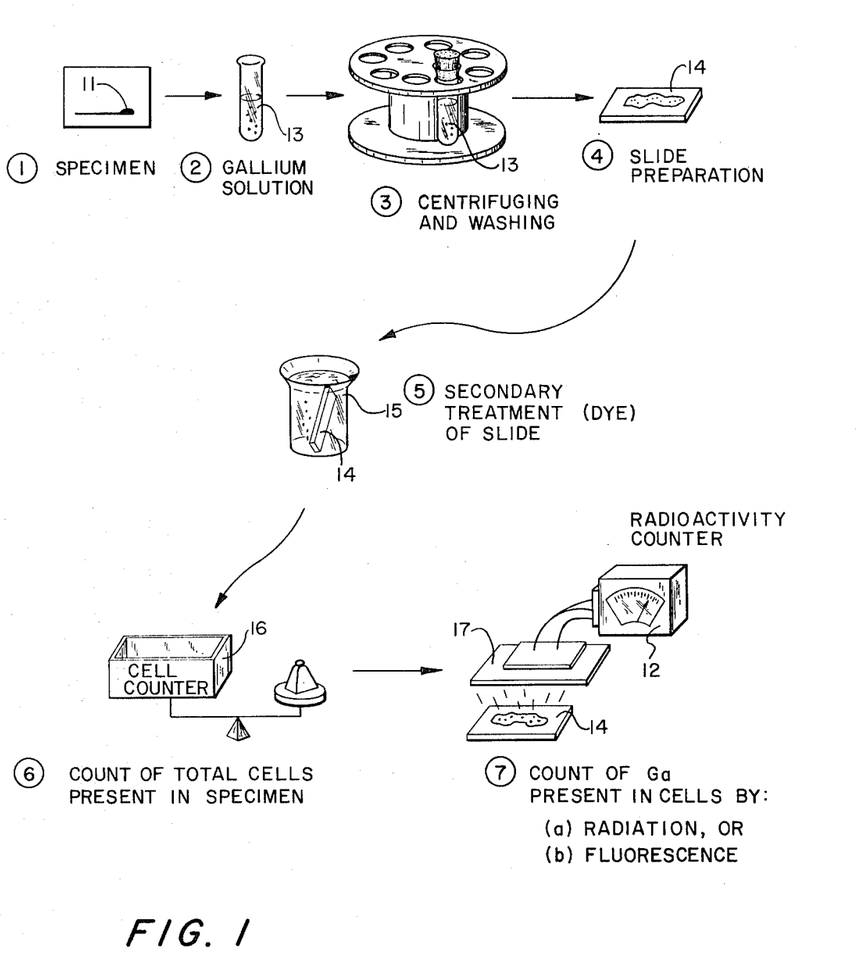
FIG. 1 is a block diagram illustrating the logical arrangement of one system according to the invention.

With reference now to the drawing and more particularly FIG. 1 thereof, there is shown a pictorial representation of one system according to the invention. A specimen 11 is processed according to the invention to provide an indication by radioactivity counter 12 of whether there is a high probability of malignant cells in specimen 11.

In step (1), specimen 11 comprises epithelial scrapings or washings, such as from the vaginal cervix or oral cavity which may be fresh or may have been previously fixed by immersion in in an alcohol solution, 70 to 100 percent by volume of methyl or ethyl alcohol. In step (2), these scrapings are placed in a gallium solution 13 containing gallium citrate or another gallium salt. If the solution is an isotonic aqueous solution with a pH approximately equal to 7.0, gallium citrate or a similar gallium complex is used to prevent the precipitation of gallium at this pH. If the solution is composed of ethyl or methyl alcohol, 70 to 95 percent by volume and water, the gallium salt used is preferably the tricholoride.

When using alcohol solutions preferential uptake of gallium by malignant, pre-malignant or inflamed cells can be enhanced over uptake by normal cells by using a solution acidity corresponding to pH 2.0 to pH 4.5 and a neutral salt to lower the average ionic activity coefficients. Such salts should contain cations with ionic radii at least 5 percent greater than the ionic radius of the tervalent gallium ion as determined by crystallographic measurements. Concentrations of such neutral salts ranging from 0.05 to 0.15 moles/liter are suitable.

The concentrations of the gallium salts are determined by the method of detection which is to be used. If non-radioactive gallium is to be used, solution concentrations should give a level of $10^{-3}$ to 1.0 micrograms of gallium per milliliter in a total solution volume of 3 to 10 milliliters. If radioactive gallium is used, the solution concentrations should be adjusted to give a level of activity of 0.1 $\mu c$/ml to 10 $\mu c$/ml in a total solution volume of 3 to 10 milliliters. Preferably enough scrapings should be placed in solution 13 so that the sample specimen comprises of the order of 1,000 to 10,000 cells or more. Scrapings customarily have a weight from 1 to 50 milligrams and comprise cellular aggregates of 50,000 to more than 1,000,000 cells.

After an equilibration period of typically 20 minutes to 24 hours, the cells are separated from the bulk of solution 13 either by centrifuging at 2,000 rpm for 10 minutes and discarding the bulk of the supernatent liquid leaving a cellular suspension approximately 0.2 ml. in volume, or by filtering off the bulk of the solution using a Millipore filter which will pass cells and debris 5 microns or smaller in diameter. When the Millipore filter is used, it is customary to enlarge the volume of the solution from 3 to 10 ml to 100 to 150 ml in order to combine an initial washing with the first separation of the bulk of the radioactive solution. Filtration is carried out until the solution volume is reduced to 6 to 15 ml.

The cellular matter is then washed. If centrifugation is used to separate the cells, the washing procedure consists in adding to the approximately 0.2 ml residue of cells, solution which is free of gallium bringing the volume of the solution from 0.2 ml to 6 to 10 ml. The solution used for washing may be an isotonic solution such as Hanks Balanced Salt solution or an aqueous methyl or ethyl alcohol solution, 70 to 95 percent by volume alcohol. The enlarged solution is stirred vigorously for a few minutes to cause the cellular matter to be fully exposed to the wash solution and then centrifuged at 2,000 rpm for 10 minutes. By this process, the cellular matter is found to collect in a compact suspension about 0.2 ml in volume from which the bulk of the wash solution may be discarded.

If filtration through a Millipore filter is used to separate the cells, the washing procedure consists of adding sufficient solution free of radioactivity to the first residue from the Millipore filtration process to bring the volume of the solution to 100 to 150 ml. The enlarged solution is then stirred vigorously for several minutes and filtered through a Millipore filter which passes material 5 microns or smaller in diameter until the volume of the solution is reduced to 6 to 15 milliliters. As in the centrifugation procedure, the washing liquid may consist of an isotonic solution such as Hanks Balanced Salt solution or an aqueous alcoholic solution containing 70 to 95 percent methyl or ethyl alcohol by volume.

The washing procedure is continued until the radioactive count in the filtered wash liquid is close to background. This customarily takes three to four washings by centrifugation and two to three washings by the Millipore filtration method. The washing procedure removes the gallium not absorbed by the cells.

After the cells have been washed, they are resuspended in an alcohol solution containing 70 to 95 percent alcohol by volume. For cells washed by centrifugation, this may be accomplished by taking the approximately 0.2 ml suspension of cells after the final centrifugation and diluting with 95 to 100 percent by volume alcohol until the final alcoholic concentration is 70 to 95 percent. For cells washed by the Millipore filtration technique, the cells are in an alcohol suspension if alcohol washing solutions have been used. If isotonic aqueous washing solutions have been used, the reduced volume after the last filtrate is increased by the addition of 95 to 100 percent by volume alcohol until a final concentration of 70 to 95 percent by volume alcohol exists and the solution volume is reduced to a convenient size (6 to 10 ml) by filtration through a Millipore filter which passes material 5 microns or less in diameter.

After washing and suspension in alcohol, an aliquot of solution is measured which contains 1,000 to 10,000 cells. The technique for obtaining such an aliquot is well known in the art and comprises a determination of the number concentration of cells in the specimen suspension using either a Coulter counter or a microscopic counting technique. A slide may be prepared from the aliquot of the final washed suspension of cells. This slide is customarily prepared from the alcoholic suspension of the cells by spraying the suspension on the slide using an artists air-brush; although the spraying technique is not essential to the success of the process. Other methods of depositing the cells on a slide may comprise taking 5 to 15 drops of the alcoholic suspension of the cells, placing them on a glass slide and allowing the alcohol to evaporate, or by using a swab dipped in an alcohol suspension of the cells to form a smear on a glass slide.

The smear slide so prepared is allowed to dry and then washed by conventional cytological methods. A convenient washing sequence is,

| a. | 95% ethyl alcohol | 1½ minutes |
|---|---|---|
| b. | 70% ethyl alcohol | 1½ minutes |
| c. | 50% ethyl alcohol | 1½ minutes |
| d. | Distilled water | 1½ minutes |
| e. | Distilled water | 1½ minutes |
| f. | 50% ethyl alcohol | 5 seconds |
| g. | 75% ethyl alcohol | 5 seconds |
| h. | 100% ethyl alcohol | 5 seconds |
| i. | xylene | 5 seconds |
| j. | xylene | 5 seconds |
| k. | xylene | 1 minute |

This procedure removes any traces of residual salt and dirt which may have precipitated on the slide during its preparation. If radioactive gallium has been used as the gallium agent, the slide is ready for counting after the xylene has dried. If non-radioactive gallium has been used as the gallium agent, further treatment of the slide is necessary.

A slide prepared from cells treated with non-radioactive gallium at the concentration levels indicated earlier may be examined by using a spot reagent for testing for gallium. Such a spot reagent may be 8-hydroxyquinoline, 5-sulfonic acid tagged with $S^{35}$. This will form an insoluble complex with gallium under the proper conditions of pH, typically for the gallium concentrations of interest within the range of pH-5 to pH-8. Such a tagging agent can give up to $8 \times 10^2$ disintegrations per second for each malignant cell. The spot reagent is then removed from the slide by a second washing procedure so that there remains the gallium complex that was absorbed by the malignant cells as an element in a composition including gallium tagged with a radioactive element.

Alternately, a slide prepared from cells treated with non-radioactive gallium may be examined by using fluorescent techniques. In this case, the slide which has been processed through the washing technique described above is suspended in a closed desiccator-like chamber which has in it enough solid 8-hydroxyquinoline to saturate the atmosphere in the chamber with its vapor and a few drops of water. This vessel is then placed in an oven at 60°C for 10 or 15 minutes. The slides are removed and the surfaces protected by cover slips. When exposed to ultraviolet light of either 3,650A or 4,358A wavelength, an intense fluoresence is seen where gallium is present. The slides may also be exposed to 8-hydroxyquinoline by introducing an additional step in the washing sequence after step c. (50% ethyl alcohol, 1½ minutes). This step consists of immersing the slides in an aqueous solution of 8-hydroxyquinoline at pH-7.

When using non-radioactive gallium, an alternate and preferable procedure for tagging the gallium with the spot reagents 8-hydroxyquinoline, 5-sulfonic acid tagged with $S^{35}$ or 8-hydroxyquinoline alone is to react these reagents with the gallium in the cells before the slides are made. This may be done immediately after the washing procedure, after the solution has been freed of excess gallium. Incorporation is made by using an isotonic solution such as Hanks Balanced Salt solution at pH-7 to dissolve the tagging reagents if the washing procedure has used Hanks Balanced Salt solution as the washing reagents and a water solution at pH-7 to dissolve the tagging agents if the washing procedure has used alcohol solutions. if alcohol solutions have been used for washing, the cells are exposed to successive washes of 70 and 50 percent by volume alcohol solution before immersing them in the tagging solution. Whether Hanks Balanced Salt solution or an aqueous solution of the tagging agent is used, the exposure time of the cells to the tagging agent for gallium ranges from 3 to 15 minutes and is followed by at least three washes of solution free of tagging agent. After the washes, the cells are suspended in alcohol following the procedure used when radioactive gallium is employed.

In step (6), slide 14 may be placed in cell counter 16, which could be a balance as indicated, to provide an indication of the number of cells gathered on the slide.

Then in step (7), slide 14 illuminates a radioactivity sensor 17 to produce counts that are counted by radioactivity counter 12 so that the degree of radioactivity is indicative of malignancy. Alternately, fluorescent techniques could be used for detection in a manner to be described below.

After detection of the gallium content, the slide may be strained by conventional cytological staining techniques for inspection by a pathologist. The Haemotoxylin and Papanicolau staining sequency or the Haemotoxylin and Eosin staining sequence are suitable.

Proposed Specific Example

A smear scraping from a patient with recurrent carcinoma of the uterine cervix was placed in 6 ml of 95 percent alcohol and kept for 15 days. A similar smear scraping from a woman without any evidence of carcinoma (Class II — Papanicolau) was taken at about the same time and kept in 6 ml of 95 percent alcohol for 17 days. At the end of that time both samples were processed simultaneously. The suspensions were first sieved through a 53 micron pore-sized sieve and 3 ml of the suspensions used for analysis. One-half ml. of an aqueous saline solution containing 52.2 gm of NaCl per liter was added to the alcohol suspensions of cells and 0.1 ml of 0.0604 N hydrochloric acid. The volume of the cell suspensions was then brought to 6 ml by adding 95 percent by volume ethyl alcohol. The calculated acidity of the final suspensions was 0.001 N in HCl and the acidity measured with a glass electrode was ph 3.3. To each of the suspensions was added 0.1 ml of a gallium trichloride solution containing 60 $\mu$C/ml of $Ga^{67}$ so that the sample received 6.0 $\mu$C of $Ga^{67}$ to give a solution concentration of 1 $\mu$C/ml of $Ga^{67}$. The specimens were exposed to the radioactive solution for 1 hour. The solutions were then diluted to 120 ml by adding 95 percent by volume ethyl alcohol. The diluted solutions were agitated vigorously for a few minutes and filtered through a 5 micron pore size Millipore filter until the solution volumes were approximately 10 ml. The solutions were again diluted with 110 ml of 95 percent ethyl alcohol, agitated and refiltered through a Millipore filter until the volumes were again 10 milliliters. This process was repeated once again. The final volumes were 8 ml for the malignant specimen and 5 ml for the normal specimen.

The final volumes of alcoholic cell suspensions were then each sprayed onto four slides using an artist's air-brush. After washing and drying, the slides were counted in a slide counter giving counts per minute after correction of background of:

$$\frac{\begin{array}{r}9550\\9544\\7613\\9203\end{array}}{35910} \text{ total for the malignant specimens, and}$$

$$\frac{\begin{array}{r}5809\\4952\\4751\\4636\end{array}}{20148} \text{ total for the normal specimens.}$$

The slide from the normal specimen giving 4952 C/min was examined by microscopic techniques to determine the probable total number of cells present. The total number of cells was estimated to be 628. The slide from the malignant specimen giving 9544 C/min was examined in the same manner and the total number of cells present on the slide was estimated to be 1,566.

Both slides were then processed by cellular autoradiography using Kodak NTB 2 emulsion and a 2-hour exposure time. After exposure and development of the emulsion, the cells on the slides were stained using conventional means. The silver grains representing the cells were then counted. Statistically random samples of 300 cells were chosen from each slide for examination.

Gallium-67 uptake of individual cells was measured by microscopic observation and counting developed Ag grains at a fixed distance from the center of the chosen cell. A Whipple eyepiece was used to measure the distance from the center of the cell, and the measurement was made at a distance of 36 micrometers from this center in four diagonally symmetrical Whipple squares of area $2.9 \times 10^{-4}$ mm² each. These measurements were combined to give the data shown in FIG. 3. These data give the relative frequency of occurrence of each cellular uptake of gallium 67 for the normal subject and for the subject with a diagnosed carcinoma of the uterine cervix. The uptake is measured in developed Ag grains in four Whipple squares.

Several conclusions are evident from these data. The average uptake of Ga 67 in a single cell in the normal subject is $14.9 \pm 0.4$ grains/4 Whipple squares = 12,850 grains/mm² (all errors are given as one standard deviation) and the corresponding uptake in the subject with cervical cancer is $32.9 \pm 0.4$ grains/4 Whipple squares = 28,420 grains/mm². These uptakes were each corrected for the measured background on their respective slides. Thus, the average Ga 67 uptake per cell in the normal cell population is about half the average uptake in a cell population taken from a patient with cervical cancer.

In order to correct for radiation from non-cellular sources, Ag grain counts of the background were made on the two slides, and, in addition, on a control slide which did not undergo any Ga 67 processing. The control slide showed a background of $8690 \pm 190$ grains/mm², the cancer slide $9,800 \pm 164$ grains/mm², and the normal slide $14,300 \pm 216$ grains/mm². The grain background due to Ga 67 activity is obtained by subtracting the grain counts on the control slide giving: $5,610 \pm 288$ grains/mm² on the normal slide and $1,100 \pm 251$ on the cancer slide. Thus, the Ga 67 background on the normal slide was about five times greater than that on the cancer slide. We attribute this increased Ga 67 background to a large amount of cellular debris on the normal slide.

The counting rate of the slides as measured by the scintillation counter may be related to the Ag grain counts as measured by visual observation by the following equation:

$$\tau C = \epsilon[Na\eta + An\beta]$$

where the measured quantities are:
 $C$ = counting rate in the scintillation counter (counts/minute)
 $\tau$ = time of exposure of the photographic emulsion of the Ga 67 activity before "fixing" of the Ag (minutes) = 120 minutes
 $\epsilon$ = efficiency of the scintillation counter = 0.0764 counts/Ga$^{67}$ disintegration
 $N$ = number of cells on the slide
 $a$ = average Ag grain density per cell as measured at a fixed distance ($36\mu$) from the center of the cell (grains/mm²)
 $A$ = area of slide = 1,400 mm²
 $n$ = density of background grains due to Ga$^{67}$ (grains/mm²)

and the parameters of the emulsion are:
 $\eta$ = conversion of grain count per cell to Ga$^{67}$ disintegrations in the cell (disintegrations/grain/cell mm²)
 $\beta$ = conversion of background grains due to Ga$^{67}$ to background Ga$^{67}$ disintegrations (disintegrations/grain)

The above equation may be expressed for the "normal" and "cancer" slide respectively as:
 $(120)\ 4952 = 0.0764\ [(628)\ (12,850)\ \eta + (1400)\ (5610)\beta]$
 $(120)\ 9544 = 0.0764\ [(1556)\ (28,420)\ \eta + (1400)\ (1110)\beta]$ Solving these equations for $\eta$ and $\beta$ gives
 $\eta = 0.316$ disintegrations/grain/cell mm²
 $\beta = 0.666$ disintegrations/grain Both of these emulsion parameters are within and order of magnitude of the expected values when the Beta-ray and Auger-electron emission of Ga$^{67}$ is taken into account, along with the geometry of the measurement and the emulsion. With these parameters established, the number of Ga$^{67}$ disintegrations per minute of an average cell from the "normal" histogram was $(12850)(0.316) \div 120 = 33.84$ disintegrations/min corresponding to an uptake of 15.2 $\mu\mu$ curies. An average cell from the "cancer" histogram had 74.84 disintegrations/minute or an uptake of 33.7 $\mu\mu$ curies. The uptake of a single average cell from the neoplastic clinical material is thus easily measurable with a scintillation counter.

Figure 3:
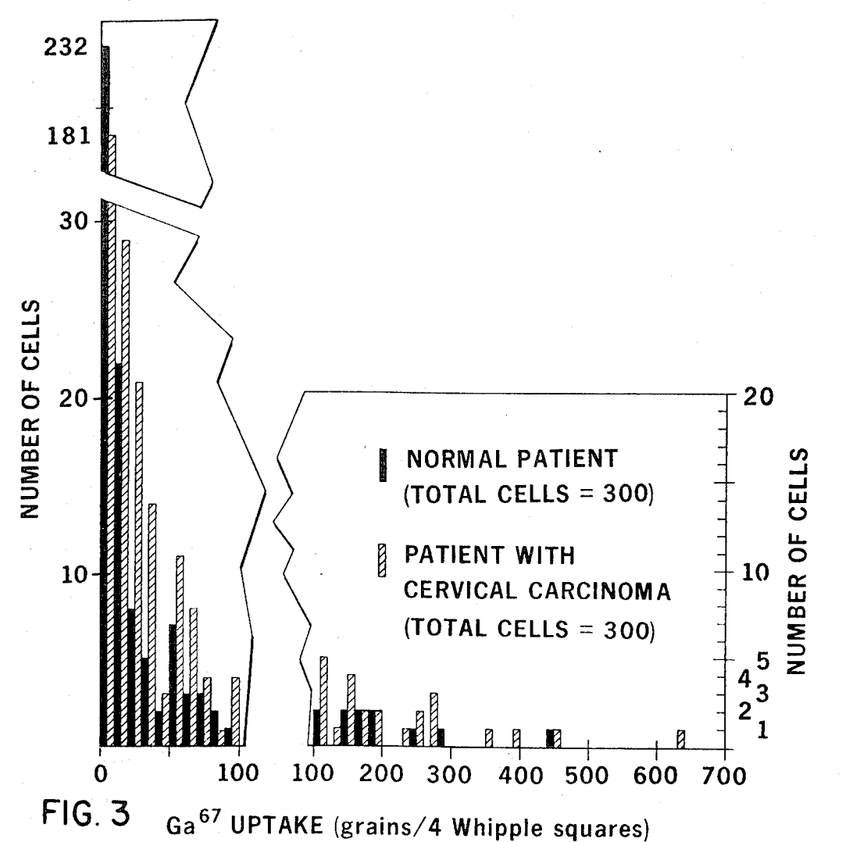
FIG. 3 is a histogram form graphical representation of distribution of counts of cells having different amounts of gallium uptake, as measured in an example of practice of the invention.

In addition to the cells forming the basis for the histograms of FIG. 3, a few objects which we believe are other single cells, or at most a few cells, were found in the cell populations taken from the patients with diagnosed carcinoma. These objects exhibited a very much higher Ga$^{67}$ uptake than the average cell of either histogram. No such cells have been found from among the 60 normal patients. A lower bound to the Ga$^{67}$ uptake for one of these cells has been estimated by assuming an inverse square law for the fall-off of grain count with distance. This lower bound is 3,680 disintegrations/minute or 1,658 $\mu\mu$ curies.

Examination of all the data shows that the conceived process clearly distinguishes between normal and malignant specimens from the human uterine cervix. In the malignant specimen, the number of cells with a low uptake of gallium-67 radio-activity has dropped from the 248 observed in the normal specimen (82.7 percent of the total cells) to 179 in the malignant specimen (59 percent of the total cells). The low counting cells in the normal specimen are replaced by higher counting cells in the malignant specimen almost doubling the number of cells with higher gallium-67 uptake.

The disintegrations per second expected from single malignant cells for the three different trace elements $Ga^{67}$, $S^{35}$ and $C^{14}$ are shown in Table 1 appended to this page. The estimates are based on a gallium concentration of 55 micrograms per gram of wet tissue. The estimates for $S^{35}$ and $C^{14}$ are based on the assumption that compounds which react with gallium would be tagged with only one sulfur or carbon atom per molecule and that only one molecule of compound would react with the gallium. By using a derivative of 8-hydroxyquinoline, this number would be increased by a factor of three because three molecules react with one gallium atom.

If $Ga^{67}$ itself is the trace element, the expected number of disintegrations may be as high as $2.2 \times 10^4$ per cell per second to allow individual cell inspection at the rate of 6,000 per minute with a single cell counting system described in greater detail below.

Attached Table II, lists an estimate of the magnitude of the total radioactivity involved with the tracer method of detecting gallium for $Ga^{67}$, $S^{35}$ and $C^{14}$ for both flow and smear techniques in both counts per second and microcuries with a sample size of 1,000 cells for flow inspecting and 10,000 cells for smear inspection. Table II furnishes estimates for assumption that 1 percent and 25 percent of the cells present picked up gallium. The total quantities of radioactivity per sample could be quite large for both flow and smear techniques using either $Ga^{67}$ of $S^{35}$ as the trace element and is lower for $C^{14}$ as the tagging agent.

The appended Table III may be used for estimating the expected background radioactivity if $S^{35}$ or $C^{14}$ were tagging agents when identifying gallium by precipitation with an 8-hydroxyquinoline type compound. If the pH were not controlled, and the estimated ion quantities of Al, Ca, Cu and the others shown in Table III precipitated completely as 8-hydroxyquinolates, the background radiation level for a single cell with a gallium concentration of 55 ppm would be 58 percent of the total radiation level and that from the chelate attached to the gallium of the cell would be 42 percent of the total radiation level. If the pH were controlled to prevent only the precipitation of the calcium and magnesium 8-hydroxyquinolates according to the data of attached Table IV, the background radiation level would be 8.5 percent of the total radiation level for a single cell and that from the gallium at the 55 ppm concentration, 91.5 percent of the total radiation level.

Since the primary contribution to the background radiation level after calcium and magnesium is iron, background radiation may be further reduced by a preliminary precipitation with a reagnet such as Cupferron before reaction with the 8-hydroxyquinoline to precipitate the iron and thereby increase the fraction of the total counts produced by the gallium of the malignant cells.

Still another major source of background radiation when tagged chelates are used to identify gallium are the red blood cells. While iron concentration is high, the total quantity of iron present is small compared to the gallium which could be present in the mean vaginal epithelial cell. The difference arises because of the large differences in cell sizes. If all the iron and magnesium of a typical red cell precipitated as hydroxyquinolates containing either $S^{35}$ or $C^{14}$ tagging atoms, the background activity of one red cell would amount to about 8 percent of the activity

TABLE 1

Radioactive Tracer Activities per Cell
Estimated Mean Cell Volume : $18,525.6 \times 10^{-12} cm^3$
Ga(at 55ppm) = $1.02 \times 10^{-12}$g ($1.45 \times 10^{-14}$g atoms)

| Characteristics | | | | Estimated |
|---|---|---|---|---|
| Tracer | Half-life | Type of Decay | Particle or -Ray Energy (MeV) | Disintegrations/ Sec/Malignant Vaginal Cell |
| $Ga^{67}$ | 78 hrs | Electron - Capture | No $B^+$ Main $\gamma$'s 0.093 (40%) 0.185 (24%) 0.296 (22%) 0.388 (79%) | $2.2 \times 10^4$ |
| $S^{35}$ | 87 days | $B^-$ | 0.167 No $\gamma$ | $8.1 \times 10^2$ |
| $C^{14}$ | 5600 yrs | $B^-$ | 0.155 No $\gamma$ | 0.034 |

TABLE 2

Radiation Levels per Sample
(Ga Concentration: 55 μg/g wet tissue)

FLOW TECHNIQUE — Sample Size: 1000 cells

| Tracer | Radioactivity (dis./sec & μCuries) | | | |
|---|---|---|---|---|
| | 1% Malignant Cells | | 25% Malignant Cells | |
| $Ga^{67}$ | $2.2 \times 10^5$ | 5.95 | $5.5 \times 10^6$ | 149 |
| One $S^{35}$ Tag per Ga atom | $8.1 \times 10^3$ | 0.22 | $2.02 \times 10^5$ | 5.45 |
| One $C^{14}$ Tag per Ga atom | 0.34 | $0.92 \times 10^{-5}$ | 8.5 | $2.3 \times 10^{-4}$ |

SMEAR TECHNIQUE — Sample Size: 10,000 cells

| Tracer | Radioactivity (dis./sec & μCuries) | | | |
|---|---|---|---|---|
| | 1% Malignant Cells | | 25% Malignant Cells | |
| $Ga^{67}$ | $2.2 \times 10^6$ | 59.5 | $5.5 \times 10^7$ | 1490 |
| One $S^{35}$ Tag per Ga atom | $8.1 \times 10^4$ | 2.19 | $2.02 \times 10^6$ | 54.5 |
| One $C^{14}$ Tag per Ga atom | 3.4 | $0.92 \times 10^{-4}$ | 85 | $2.3 \times 10^{-3}$ |

Table 3. Vaginal Epithelial Cell Data (eff. 21 April 1972)

| Mean Dry Weight | $10^{-12}$ gms | Mean % Dry Weight |
|---|---|---|
| Cytoplasm | 949.2 | 4.98 |
| Nucleus | 40.61 | 8.71 |
| Estimated ion Quantities: | | |
| Al | .008 | |
| Ca | .66 | |
| Cu | 0.003 | |
| Fe | 0.054 | |
| Ga | 0.00004 → 1.02 | |
| K | 3.5 | |
| Mg | 0.28 | |
| Na | 17.2 | |
| Rb | 0.0015 | |
| Zn | 0.0024 | |

Table 4. The Effect of pH on Precipitation
(eff. 21 April 1972)

produced by the tag hydroxyquinolate which precipitated with the gallium in an epithelial cell. If detection is accomplished by integrating the radiation from tagged chelates, preliminary processing to remove iron as described above will help eliminate the possibility of iron from red cells reacting with the chelate and producing a high background level. Alternately, the specimen could move through a capillary tube past a radioactivity detector and the cells examined substantially one-by-one.

Figure 2:
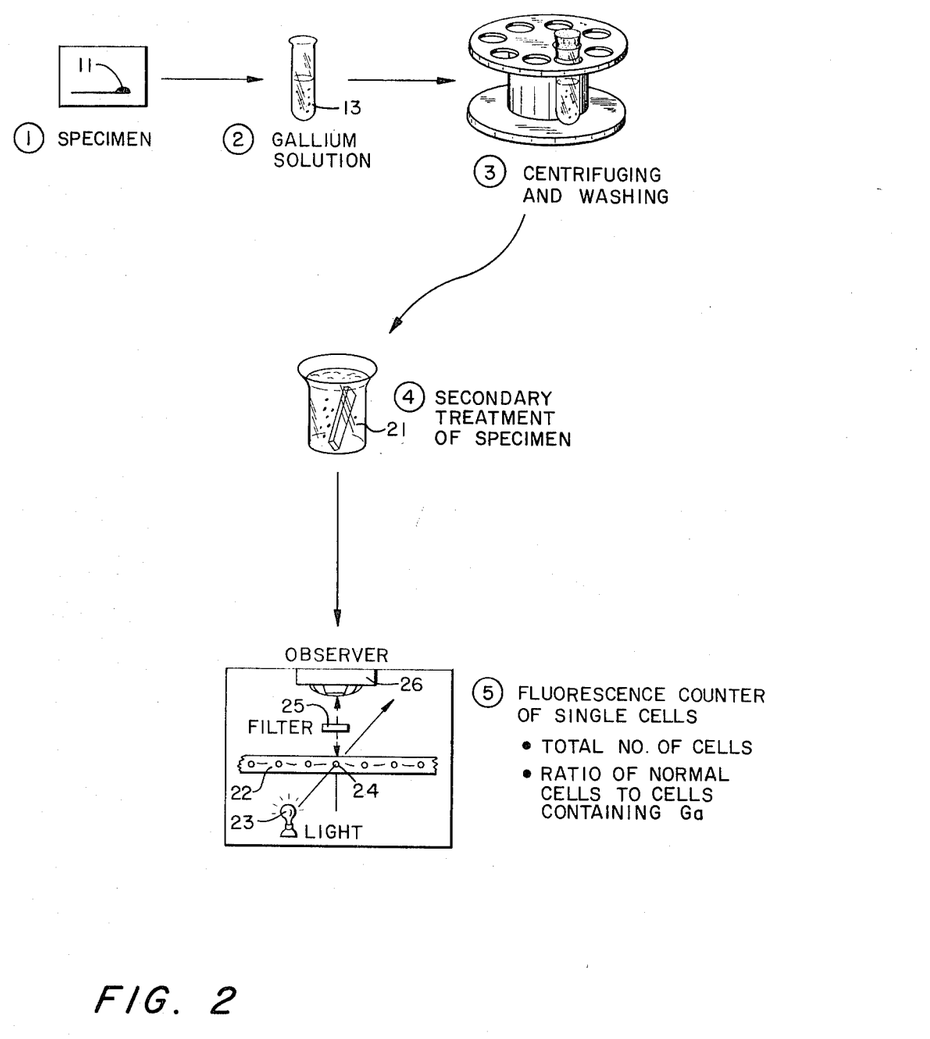
FIG. 2 is a pictorial diagram illustrating another system according to the invention.

Referring to FIG. 2, there is shown a pictorial representation of an alternate arrangement for detecting malignancy according to the invention. Steps (1), (2) and (3) are the same as described above in connection with the system of FIG. 1. Step (4) comprises a secondary treatment of the specimen in solution 21.

When using the alternate arrangement for detecting malignancy according to the invention, the cells are preferably suspended in an isotonic solution such as Hanks Balanced Salt solution, although an organic solution such as alcohol, xylene or napthalene may be used.

If the method of detecting gallium in the flow analysis technique is based on the use of gallium 67, then the scrapings are suspended in either Hanks Balanced Salt solution or alcohol before any exposure to gallium occurs, and an aliquot of solution is measured out which contains 1,000 to 10,000 cells. This aliquot is then exposed to a gallium-containing solution which contains 1 to 2 $\mu c$/1,000 cells. The conditions of exposure are the same as have been described for the smear method (Method I). Such an exposure to gallium 67 will give a counting rate of about 3 counts/sec. for normal cells and 10 counts/sec. to 30 counts/sec. or more for malignant cells, assuming a counter efficiency of 10 percent.

After exposure to gallium 67, the cells are washed by centrifugation or Millipore filtration and the cell suspension allowed to flow slowly through a radioactivity counting apparatus. If the method of radioactivity counting is based on the liquid scintillation technique, then after washing the cells must be suspended in a liquid compatible with the scintillation chemical. The presence of single cells within the range of the counter is determined automatically by observing the light scattered by each cell as it passes through a microscopically wide light beam before entering the counter. The counter is gated with the scattered light pulse in such a manner that counts are accepted only when a cell is within the domain of the counter. Techniques for such gating arrangements are well known to those experienced in the art of nuclear counting.

Under the conditions described normal cells are detected through a counting rate of 0 to 4 $\pm$ 2 counts/sec. and malignant cells by counts of 12 $\pm$ 4 to 30 $\pm$ 5 or more counts per second. The counts for individual cells are tallied, and the detection apparatus reports the results as a chart of number of cells versus counting rate. Malignant specimens differ from normal specimens in having substantially 1 percent or more of the cell population with counting rates of 10 counts/sec. or more.

If the method of detecting gallium in the flow analysis technique is based on the use of non-radioactive gallium, then it is not essential to determine the concentration of cells per unit volume before exposure to the gallium-containing solution. A typical cell scraping will contain 25 mg of material which corresponds to approximately a million cells. In order to attain a detectable level of gallium in such a specimen, it is necessary to expose it to a total of 1.5 micrograms of gallium.

This can be achieved by suspending the scraping in a 10 ml isotonic solution such as Hanks Balanced Salt solution containing 0.15 micrograms of gallium per milliliter as gallium trichloride. The pH of such a solution should be pH-7 and sufficient sodium citrate should be added to prevent precipitation of the gallium (approximately 0.1 to 1 milligram of sodium citrate/ml). An alternate and preferred method is to use an alcoholic solution containing the correct amount of neutral salt and a pH of approximately 3.0. At this acidity the gallium can be kept in solution without the use of a citrate complex.

After exposure to the gallium solution, the cells are washed by centrifugation or Millipore filtration and the cell suspension subjected to a secondary treatment. The secondary treatment consists of exposing the cells to either 8-hydroxyquinoline 5-sulfonic acid tagged with $S^{35}$ or 8-hydroxyquinoline alone. Incorporation of these tagging agents into the cells to identify the gallium is made by dissolving the reagents in isotonic salt solutions with pH's in the range from 6.0 to 7.5 and suspending the cell residue after centrifugation or Millipore filtration in the tagging solution for 3 to 30 minutes. After exposure to the tagging solution, the cells are washed with isotonic salt solution using centrifugation or Millipore filtration to remove the washing liquids.

When using 8-hydroxyquinoline, 5-sulfonic acid tagged with $S^{35}$, it is advisable to expose to the tagging agent only a measured aliquot of the cell suspension previously treated with gallium. This aliquot should contain 1,000 to 10,000 cells. The purpose of restricting exposure to the tagging agent is to cut down the amount of radioactive $S^{35}$ needed per sample.

The tagged and washed cells are then examined in a flow analysis apparatus. If the tagging agent used was 8-hydroxyquinoline 5-sulfonic acid tagged with $S^{35}$, the radioactivity of the $S^{35}$ is considered a measure of the gallium present. In addition, the cells may be irradiated with ultraviolet light and the flourescence of the gallium 8-hydroxyquinoline 5-sulfonic acid complex determine for each cell. The fluorescent measurement and the radioactivity measurement are gated together to ensure that the radioactivity count is absolutely associated with a single cell.

If the tagging agent was 8-hydroxyquinoline alone, detection of the gallium is made through fluorescence from each cell as it is exposed to ultra-violet light.

Step 5 comprises detecting the fluorescence of the cells to determine an indication of potential malignancy. More particularly the specimen passes through a capillary tube 22 to permit a cell-by-cell examination of fluorescence as light source 23 illuminates the cell being observed at point 24 through a filter 25 and photodetector 26. If radioactivity were representative of malignancy, a radioactivity detector could be positioned to sense the radioactivity at point 24.

Observation of the fluorescence of the compound formed between gallium and 8-hydroxyquinoline is a convenient method for detecting gallium concentrations in malignant cells. This compound precipitates in aqueous solutions with pH's greater than 2.8 according to the reaction, The hydroxyquinolates of some other metals also show fluorescence under the same conditions as gallium, the most common being those of aluminum and zinc. However, the cellular concentrations of these ions are expected to be much lower than those of gallium. Although copper and iron form colored hydroxyquinolates these do not fluoresce. Some background fluorescence may also be expected from the organic constituents of the cell. This is not expected to be comparable to that of a gallium hydroxyquinolate compound at the proper wavelength regions.

Conveniently, gallium concentrations are determined by extracting the gallium hydroxyquinolates into a chloroform solution. This solution is irradiated with light of 3,650A or 4,358A wavelengths, and the fluorescence intensity measured with a photomultiplier. The 8-hydroxyquinoline chelates are reported to fluoresce in aqueous solution so that organic solvents are not essential to observe the effect. Most 8-hydroxyquinoline chelates are, however, insoluble at pH's above 3.0, and dissolution of the precipitates in chloroform provides an efficient means for obtaining nearly uniform activation as well as permitting extra-action of the chelate from extraneous ions which may be present in the aqueous solutions.

Precipitation of a gallium 8-hydroxyquinolate within the cytoplasmic fluid is expected at pH's which prevent the precipitation of all but a few other ions. Those extraneous ions which do precipitate are expected to form a total mass which is small compared to that formed by the gallium.

The illumination conditions necessary for observation of the fluorescence of the gallium 8-hydroxyquinolate precipitate within the cytoplasmic fluid may be estimated in the following manner. The basic equation for the estimation is:

$$F = H_o K E c l A,$$

where $F$ is the fluorescent power radiated (watts) from the sample over all solid angles, $H_o$ is the irradiance of the sample (watts/cm$^2$), $K$ is the fluorescent yield of the substance.

$E$ is the molar extinction coefficient of the complex, $c$ is the concentration of the complex in moles/liter, $l$ is the path length through the absorbing medium, and $A$ is the cross sectional area of the solution containing the complex.

The value of $E$ at 4,358A for the gallium complex of 8-hydroxyquinoline is approximately 6,400cm$^{-1}$ mole$^{-1}$ liters. The molar concentration of gallium hydroxyquinolate in cytoplasmic fluid corresponding to a concentration of 55ppm in wet tissue is $0.79 \times 10^{-3}$ moles/liter. The average path length through a spherical cell is about 0.85 of the cell diameter or $28.2 \times 10^{-4}$ cm. The fluorescent efficiency $K$ of the gallium 8-hydroxyquinolate complex in the cytoplasmic fluid is of the order of 0.01. Substituting these valves in the equation yields, $F = 1.47 \times 10^{-4} H_o A$.

The light scattered from the cell may be estimated from the scattering theory for large droplets. Assuming that the refractive index of the cell wall is 1.53 and that of the solution 1.33, the light of 4,358A scattered by diffraction at 90° to the incident beam is estimated to be $I_{diff} = 0.793 \times 10^{-4} H_o A$ watts/cm$^2$ steradian, and that by reflection at 90° to the incident beam is $I_{ref} = 8.2 \times 10^{-4} H_o A$ watts/cm$^2$ steradian. The units of incident irradiance $H_o$ are the same in the equation expressing scattering and fluorescence. The units of scattered intensity are in terms of watts/cm$^2$ per unit solid angle. (The scattered light is of the same magnitude as the fluorescent light).

The scattered light may be removed by using a high pass (long wavelength pass) filter 25 in FIG. 2. Although the 3,650A excitation produces fluorescence of greater intensity, it may be more advantageous to use the 4,358A wavelength to reduce possible fluorescence from organic constituents of the cell. A broadband filter may be used to exclude scattered excitation light from the detector 26 without reducing the fluorescence intensity appreciably because the fluorescent band power for 4,358A excitation is quite small until wavelengths greater than 4,500A are reached. Broadband filters capable of passing 60 percent of the fluorescent energy and blocking more than 99.9 percent of the excitation energy may reduce the scattered intensity to about 1 percent of the fluorescent intensity from the gallium in the cell.

In a preferred flow process cells suspended in an aqueous suspension may be inspected at the rate of 10$^4$ to 10$^5$ cells per minute with techniques such as that described by VanDilla, et al., in 163 SCIENCE 1213–1214 (1969). In such a system an area of about 100 microns in diameter may be illuminated at point 24 and cells pass the detector, which is at right angles to the illumination, at the rate of 1 per 15 to 20 microseconds.

The illumination power requirements for such a flow system having a detection system based on gallium fluorescence may be modest. The various efficiencies are

| | Loss Factor |
|---|---|
| Fluorescent Efficiency K δ cl | 1.47×10$^{-4}$ |
| Area Utilization of Incident Beam $\pi(d/2)^2/\pi(100/2)^2$ | 0.11 |
| Fraction of total solid angle intercepted by detector | 0.15 |
| Filter | 0.50 |
| Detector Efficiency 0.10 | |
| Transmission losses | 0.01 |
| Estimated Total Loss Factor | 1.2×10$^{-9}$ |

For the average photomultiplier, the total number of noise pulses per second is about $5 \times 10^4$ corresponding to a mean interval between noise pulses of 20 microseconds.

If a count of 100 photons per cell containing 55 ppm gallium is desired in 20 microseconds, $10^2/(1.2 \times 10^{-9} \times 2.0 \times 10^{-5})$, or $0.415 \times 10^{16}$ photons/second are required from the illumination system. Radiant energies of the order of 4.2 to 76 watts are available from standard mercury lamps in the 4,300 to 4,400 A range. Although these values must be reduced by factors of about 100 to allow for losses in collecting the light from the lamp and focusing it into the illumination system, lamp power intensity is not a limiting factor. Lasers providing 100 milliwatts of 3,638A light which can readily be focused upon the desired area of illumination may also be utilized as a source.

An important aspect of the invention is the discovery that exfoliated malignant cells of the vaginal fluid may selectively pick up gallium with absolute concentration of gallium in the range from $10^{-20}$ g Ga/cell to as high as $10^{-12}$ g Ga/cell. The higher concentrations facilitate direct identification of individual malignant cells. Thus, the invention offers not only a material reduction in the time for determining potential malignancies but also is characterized by the potential for detecting incipient malignancy with greater accuracy than with present manual techniques.

A number of important discoveries have been made in connection with the invention. It has been discovered that orders of magnitude more gallium may be added to the processing solution and the pickup of gallium per cell increases more or less proportionately. This unobvious property facilitates measuring the pickup of individual cells with a radioactive counter when the gallium is radioactive. Increasing the gallium concentration in the processing solution results in more gallium pickup by the cells to increase the magnitude of the difference between normal and malignant cell radioactivity.

It was discovered that some cells in a cancer patient, out of say 5,000 cells showed extraordinarily high $Ga^{67}$ pickup with an expected count of 100 counts/second for these cells as compared with a background count of 1 count/minute. Such cells with extraordinarily high pickup are referred to as "whoppers." No "whoppers" were found in the normal cells among 60 patients.

For modest concentrations of gallium the average counting rate is typically 4 counts/minute for a single normal cell and 8 counts per minute for a single malignant cell that is not a whopper. By increasing the concentration of radioactive gallium in the processing solution, the pickup may be proportionately increased so that the difference between counts in a single normal cell and a single malignant cell may be of the order of hundreds a second. Another feature of the invention is that the gallium may be reprocessed and reused.

In an actual example 300 cells each were individually measured on a cancer patient slide and on a normal patient slide using a histogram to verify that the radioactivity from a malignant cell not a whopper is about twice that of a normal cell. (FIG. 3)

Another important feature of the invention is that cells may be fixed in alcohol or other suitable fixing agent and be tested for malignancy according to the invention long after removal from a person. It appears as if this interval from removal and fixing to testing according to the invention may be indefinite.

There is set forth above preferred pH ranges of the solution in which cells are exposed to gallium and preferred concentrations of certain salts to obtain optimum discrimination between malignant and nonmalignant cells. Although these ranges and concentrations are important aspects of the invention, others may be used within the principles of the invention.

It is evident that those skilled in the art may now make numberous uses and modifications of and departures from the specific apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A method of detecting malignant cells which method includes the steps of gathering a sample of exfoliated cells that may include malignant cells,
    placing the cells in a solution containing a gallium compound and allowing the gallium to be absorbed from the solution by the cells,
    washing out the gallium from the solution except for that absorbed by the cells,
    and detecting the gallium in the cells in said solution.

2. A method of detecting malignant cells in accordance with claim 1 and further including the step of relatively displacing the cells and the means for detecting to provide an indication of the gallium absorbed by each cell.

3. A method of detecting malignant cells in accordance with claim 1 and further including the steps of precipitating a gallium compound through reaction with said cells and detecting radiant energy associated with said precipitate of intensity related to the quantity of gallium there.

4. A method of detecting malignant cells in accordance with claim 3 wherein said radiant energy originates from a light source.

5. A method of detecting malignant cells in accordance with claim 3 wherein said radiant energy originates from a radioactive substance.

6. A method of detecting malignant cells in accordance with claim 5 wherein said Gallium is $Ga^{67}$.

7. A method of detecting malignant cells in accordance with claim 5 and further including the step of tagging said Gallium compound with a radioactive element.

8. A method of detecting malignant cells in accordance with claim 7 wherein said radioactive element is from the group consisting of $S^{35}$ and $C^{14}$.

9. A method of detecting malignant cells in accordance with claim 8 wherein said precipitate is subjected to 8-hydroxyquinoline 5-sulfonic acid tagged with $S^{35}$.

10. A method of detecting malignant cells in accordance with claim 3 wherein said precipitate is subjected to a material from the group consisting of 8-hydroxyquinoline and 8-hydroxyquinoline 6-sulfonic acid tagged with $S_{35}$.

11. A method of detecting malignant cells in accordance with claim 3 wherein said radiant energy originates from both a light source and a radioactive substance.

12. A method of detecting malignant cells in accordance with claim 3 and further including the steps of passing said cells through a capillary tube,
    and sensing the radiation from each cell as it passes an inspection point.

13. A method of detecting malignant cells in accordance with claim 7 wherein said sensing the radiation step comprises counting the radioactivity of each cell as it passes said inspection point.

14. A method of detecting malignant cells in accordance with claim 13 and further including the steps of observing the light scattered by each cell as it passes through a microscopically wide light beam just before reaching said test point to provide a scattered light pulse,
    and gating a radioactivity counter with said scattered light pulse to accept counts only when a call is at said inspection point.

15. A method of detecting malignant cells in accordance with claim 4 and further including the step of selectively detecting radiation from the group of spectral lines consisting of substantially 3,650A and 4,358A.

16. A method of detecting malignant cells in accordance with claim 15 and further including the step of attenuating scattered light energy of wavelengths outside that of the spectral line being detected.

17. A method of detecting malignant cells in accordance with claim 1 wherein said cells remain in said solution for an equilibration period of substantially ½ to 24 hours so that gallium pickup by malignant cells is substantially complete and further including the steps of preparing a smear of said cells after said washing out step, measuring said smear to provide an indication of the number of cells therein, and measuring radiant energy from said smear.

18. A method of detecting malignant cells in accordance with claim 17 and further including the steps of following said washing out step by dyeing said cells with a dye having a high specific fluorescence when combined with gallium, illuminating said smear with ultraviolet energy, and measuring the fluorescence of said smear in response to being illuminated with said ultraviolet energy.

19. A method of detecting malignant cells in accordance with claim 18 wherein said dye comprises 8-hydroxyquinoline.

20. A method of detecting malignant cells in accordance with claim 1 wherein said compound is a gallium salt.

21. A method of detecting malignant cells in accordance with claim 20 wherein said salt is from the group consisting of gallium citrate and gallium chloride.

22. Apparatus for detecting malignant cells comprising, a solution containing a gallium compound, means for combining a sample of exfoliated cells that may include malignant cells with said solution for transferring gallium from said solution to said cells for absorption thereby, means for washing said cells to remove substantially all gallium except that absorbed by said cells, radiant energy means combinable with cells for emitting radiant energy from cells in an amount related to gallium absorption by said cells, and means for detecting radiation from said cells to provide an indication of the amount of gallium absorbed thereby.

23. Apparatus for detecting malignant cells in accordance with said claim 22 and said radiant energy means comprising means for providing radioactive material to said cells in relation to the amount of gallium absorbed thereby, said means for detecting comprising means for counting the radioactivity of said cells.

24. Apparatus for detecting malignant cells in accordance with claim 22 and said radiant energy means comprising means for dyeing the washed cells with a dye having a high specific fluorescence when combined with gallium, and means for illuminating the dyed cells with ultraviolet energy to produce a fluorescence of intensity related to the amount of gallium absorbed thereby, said means for detecting comprising means for measuring said intensity.

25. Apparatus for detecting malignant cells in accordance with claim 22 and further comprising, means for passing the washed cells one-by-one past an inspection point, said detecting means positioned adjacent said inspection point for detecting radiation from each cell as it passes said inspection point.

26. A method of detecting malignant cells in accordance with claim 1 and further including the step in fixing the exfoliated cells in a fixing agent shortly after gathering them from a human being so that they may be processed according to the remaining steps for malignancy detection.

27. A method of detecting malignant cells in accordance with claim 26 wherein said fixing agent comprises alcohol.

* * * * *

UNITED STATES PATENT OFFICE
CERTIFICATE OF CORRECTION

Patent No. 3,857,033　　　　　　　　　　Dated December 24, 1974

Inventor(s) Carolus M. Cobb

It is certified that error appears in the above-identified patent and that said Letters Patent are hereby corrected as shown below:

Column 1, line 56, change "a typical" to -- atypical --.

Column 6, line 28, change "strained" to -- stained --.

Column 8, line 32, change "and" to -- an --.

Column 20, lines 38 and 42, change "precipitate is" to -- cells are --, both occurrences.

Column 22, line 35, change "in" to -- of --.

Signed and sealed this 20th day of May 1975.

(SEAL)
Attest:

RUTH C. MASON
Attesting Officer

C. MARSHALL DANN
Commissioner of Patents
and Trademarks